Patented Nov. 10, 1931

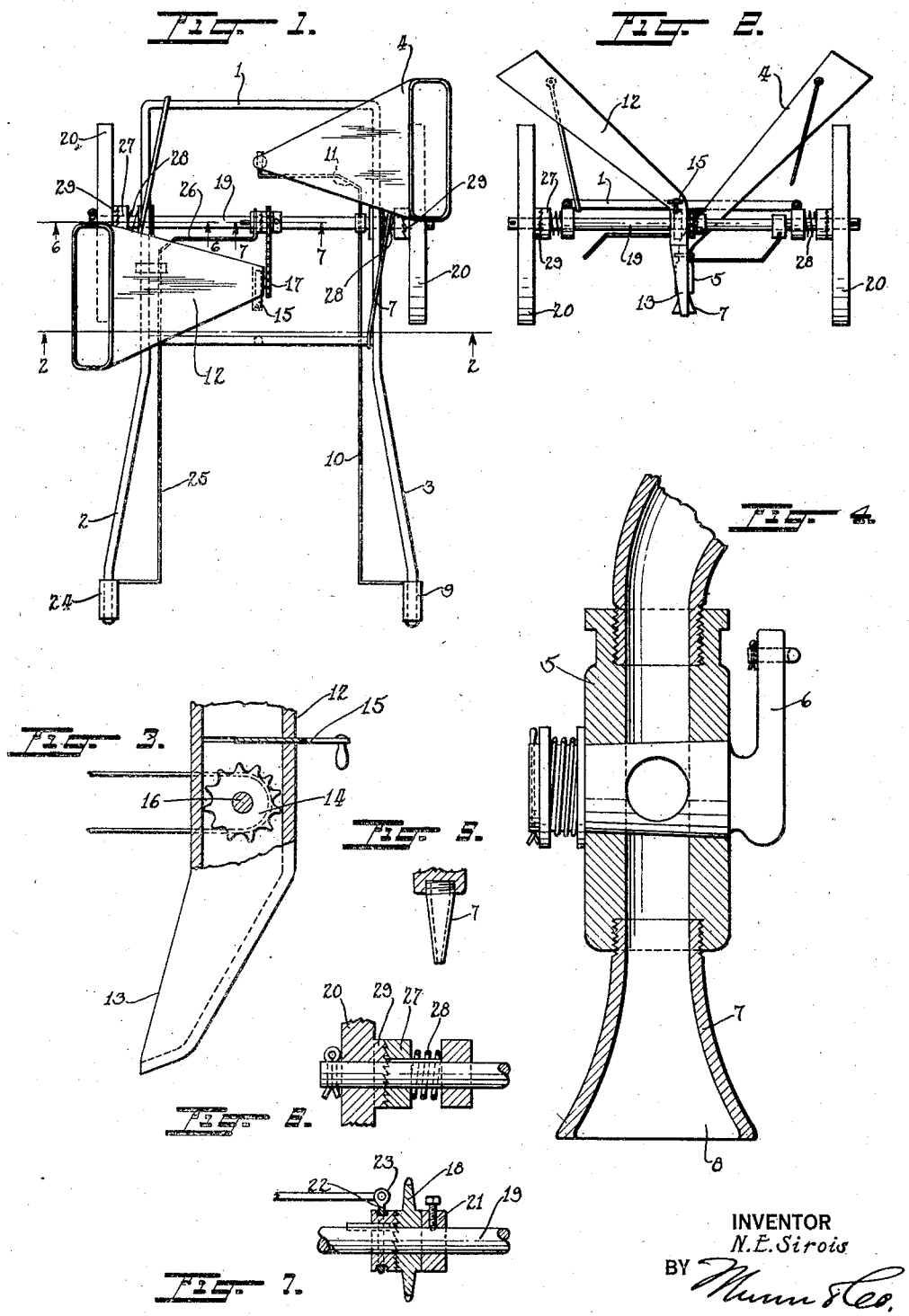

1,831,146

UNITED STATES PATENT OFFICE

NEAL E. SIROIS, OF SHELBY, INDIANA

CRACK FILLING DEVICE

Application filed February 11, 1929. Serial No. 339,219.

My invention relates to improvements in crack filling devices, and it consists in the combinations, constructions, and arrangements herein described and claimed.

An object of my invention is to provide a crack filling device which is especially adapted to fill cracks in highways which are constructed of cement, asphalt, and the like.

A further object of my invention is to provide a device of the type described which has novel means for pouring a liquid, such as tar, into the crack and immediately after pouring crushed stone over the liquid.

A further object of my invention is to provide a device of the type described which has novel means for varying the flow of the liquid and of the quantity of crushed stone passing therefrom.

Other objects and advantages will appear in the following specification, and the novel features of the invention will be particularly pointed out in the appended claims.

My invention is illustrated in the accompanying drawings forming part of this application, in which Figure 1 is a top plan view of my device, Figure 2 is a section substantially along the line 2—2 of Figure 1, Figure 3 is a detail view of a portion of the crushed stone containing hopper, Figure 4 is an enlarged detail view of the valve portion of the liquid container.

Figure 5 is a detail view of the dispensing nozzle of the liquid container,

Figure 6 is a section along the line 6—6 of Figure 1, and

Figure 7 is a section along the line 7—7 of Figure 1.

In carrying out my invention I provide a frame 1 having rearwardly and upwardly extending handle portions 2 and 3. A liquid container 4 is rigidly secured to the frame 1 and has a valve portion 5 positioned at the center line of the frame. A valve lever 6 is carried by the valve 5 and is arranged to be actuated so as to open and close the valve. A nozzle 7 is rotatably carried by the valve 5 and is provided with a narrow elongated outlet opening 8. A gripping member 9 is carried by the handle 3 and is operatively connected to the lever portion 6 of the valve 5 by means of rods 10 and 11.

A crushed stone hopper or containing member 12 is carried by the frame 1 and is provided with an outlet spout 13. A toothed dispensing wheel 14 is rotatably disposed in the hopper 12 adjacent the spout 13. A shutter 15 is disposed in the hopper 12 above the wheel 14 for a purpose hereinafter described.

The wheel 14 is rigidly mounted upon a shaft 16 which is rotatably carried by the hopper 12 and has disposed upon the outer end thereof a sprocket wheel 17. The sprocket wheel 17 is operatively connected to a sprocket wheel 18 which is rotatably carried by a shaft 19. The shaft 19 is rotatably carried by the frame 1 and is provided with drive wheels 20 at the outer ends thereof. A collar 21 is disposed concentric with the shaft 19 and is rigidly secured thereto for holding the sprocket wheel 18 against lateral displacement in one direction.

A toothed clutch member 22 is keyed to the shaft 19 and arranged to be moved longitudinally with respect thereto. The sprocket wheel 18 is provided with a toothed portion 23 which is arranged to receive the teeth of the clutch 22 for operatively connecting the sprocket wheel 18 with the shaft 19. A gripping member 24 is rotatably carried by the handle portion 2 and is operatively connected to the clutch member 22 by means of rods 25 and 26.

Ratchet wheels 27 are keyed to the shaft 19 for operatively connecting the wheels 20 to the shaft and for allowing one of the wheels to turn faster than the other one as when turning a corner. Expansive springs 28 are provided for normally holding the ratchet wheels 27 in engagement with the toothed portions 29 of the wheels 20.

From the foregoing description of the various parts of the device, the operation thereof may be readily understood. Let us assume that the device is to be used for filling cracks in concrete roads and that the liquid container 4 is filled with a liquid such as tar or the like, and the hopper 12 is filled with crushed stone or any other suitable material. The device is then positioned over the crack so that the nozzle 7 and the spout 13 will be in alignment therewith. If the operator wishes a wide stream of the liquid, the nozzle 7 is positioned as indicated in Figure 4. If the operator wishes a narrow stream of liquid, the nozzle 7 is positioned as indicated in Figure 5. Then by actuating the gripping member 9 the valve 5 will be opened allowing the liquid to pass from the container 4 through the nozzle 7, and into the crack in the road. The device is moved forwardly at a sufficient rate of speed to allow the desired quantity of liquid to be disposed in the crack.

After the actuation of the gripping member 9 so as to cause the flow of the liquid into the crack, the operator actuates the gripping member 24 so as to move the clutch member 22 into engagement with the sprocket wheel 18. When the clutch 22 is in engagement with the sprocket wheel 18, the sprocket wheel 18 is operatively connected to the shaft 19 and rotates therewith. The rotation of the sprocket wheel 18 imparts a rotating movement to the wheel 14 thus causing quantities of crushed stone to be directed into the spout 13. The crushed stone is directed from the spout 13 to the liquid which has filled the crack in the road.

The operator may close the valve 5 by rotating the gripping member 9 in the opposite direction and in a similar manner he may disconnect the dispensing wheel 14 from the shaft 19. The purpose of the construction illustrated in Figure 6 and provided for each of the wheels, is to allow one of the wheels to turn faster than the other when turning a corner.

It will be noted that the containers 4 and 12, while having their delivery spouts in alignment along the central longitudinal axis of the machine, are inclined upwardly and outwardly, their open ends extending beyond the planes of the wheels. This construction has two advantages. In the first place, it provides an easy means for filling the containers, since their open ends are in position to be easily reached without the necessity of bending over the frame. This also gives a balanced construction to the device. Another feature is that it leaves an open space through which an unobstructed view may be had of the roadway ahead so as to enable the device to be propelled in a definite direction along the line desired.

I claim:

1. A device of the type described comprising a frame, wheels for supporting the frame, a liquid container carried by the frame and having an outlet disposed in the central longitudinal axis of the frame, said container being inclined upwardly and outwardly, and a second container disposed in the rear of said first-mentioned container and having its outlet in alignment with the outlet of the first-mentioned container and being inclined to the opposite side of the frame the space between the containers affording an unobstructed view of the roadway.

2. A device of the type described comprising a frame, wheels for supporting the frame, a liquid container carried by the frame and having an outlet disposed in the central longitudinal axis of the frame, said container being inclined upwardly and outwardly, a second container disposed in the rear of said first-mentioned container and having its outlet in alignment with the outlet of the first-mentioned container and being inclined to the opposite side of the frame, the space between the containers affording an unobstructed view of the roadway, handles for said frame, means connected with one handle for controlling the discharge from one of said containers, and means connected with the other handle for controlling the discharge from the other container.

3. In a device of the type described, a frame, wheels carried by said frame, and a liquid container supported on the frame and having an outlet disposed in the central longitudinal axis of the frame, said outlet being provided with adjustable means for varying the width of the discharge with respect to the transverse axis of the frame, the upper part of the said container being extended outwardly and upwardly and said container having an open end disposed on the exterior of the frame.

4. In a device of the type described, a frame, wheels carried by said frame, a liquid container supported on the frame and having an outlet disposed in the central longitudinal axis of the frame, said outlet being provided with adjustable means for varying the width of the discharge with respect to the transverse axis of the frame, the upper part of the said container being extended outwardly and upwardly and said container having an open end disposed on the exterior of the frame, and a second container having an outlet disposed in the rear of and in alignment with the first-named outlet, the upper part of said second container extending toward the opposite side of the frame and having an open end outside of said frame, the space between the containers affording an unobstructed view of the roadway.

5. In a device of the type described, a frame, wheels carried by said frame, a liquid container supported on the frame and having an outlet disposed in the central longitudinal axis of the frame, said outlet being provided with adjustable means for varying the width of the discharge with respect to the transverse axis of the frame, the upper part of the said container being extended outwardly and upwardly and said container having an open end disposed on the exterior of the frame, a second container having an outlet disposed in the rear of and in alignment with the first-named outlet, the upper part of said second container extending toward the opposite side of the frame and having an open end outside of said frame, the space between the containers affording an unobstructed view of the roadway, a pair of handles carried by said frame, means carried by one of said handles for controlling the discharge from said first-named container, means for causing a discharge from the second-named container by the movement of the wheels, and means carried by one of the handles for controlling the discharge from the second-named container.

Signed at Lowell in the county of Lake and State of Indiana this 1st day of February, A. D. 1929.

NEAL E. SIROIS.